United States Patent
Baeuerle

(10) Patent No.: US 8,708,073 B2
(45) Date of Patent: Apr. 29, 2014

(54) GENERATOR UNIT, IN PARTICULAR FOR MOTOR VEHICLES

(75) Inventor: Michael Baeuerle, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 12/900,892

(22) Filed: Oct. 8, 2010

(65) Prior Publication Data
US 2011/0095541 A1    Apr. 28, 2011

(30) Foreign Application Priority Data
Oct. 28, 2009  (DE) .......................... 10 2009 046 076

(51) Int. Cl.
*F02C 3/00*      (2006.01)
(52) U.S. Cl.
USPC ....................................................... 180/65.31
(58) Field of Classification Search
None
See application file for complete search history.

(56) References Cited

U.S. PATENT DOCUMENTS

| | | | |
|---|---|---|---|
| 4,680,933 A * | 7/1987 | Bozung et al. | 60/608 |
| 5,105,624 A * | 4/1992 | Kawamura | 60/608 |
| 6,324,846 B1 * | 12/2001 | Clarke | 60/605.2 |
| 6,801,846 B1 * | 10/2004 | Rodriguez et al. | 701/102 |
| 6,865,891 B2 * | 3/2005 | Walsh et al. | 60/792 |
| 6,901,759 B2 * | 6/2005 | Frutschi | 60/772 |
| 6,917,873 B2 * | 7/2005 | Itoyama | 701/108 |
| 6,968,689 B2 * | 11/2005 | Bleile et al. | 60/612 |
| 7,000,393 B1 * | 2/2006 | Wood et al. | 60/605.2 |
| 7,859,127 B2 * | 12/2010 | Tateoka | 290/52 |
| 7,937,945 B2 * | 5/2011 | Kinde, Sr. | 60/767 |
| 8,091,357 B2 * | 1/2012 | Robel | 60/600 |
| 8,281,588 B2 * | 10/2012 | Garrett et al. | 60/612 |
| 2007/0234721 A1 * | 10/2007 | Vuk | 60/608 |
| 2011/0083444 A1 * | 4/2011 | Bathina et al. | 60/776 |

FOREIGN PATENT DOCUMENTS

DE    20 2008 008 567    12/2008

* cited by examiner

*Primary Examiner* — Katy M Ebner
(74) *Attorney, Agent, or Firm* — Kenyon & Kenyon LLP

(57) ABSTRACT

A generator unit, in particular for motor vehicles, having at least one generator for producing electrical power and having a multi-stage compressor unit that includes at least two compressors connected in series and downline from which there is a turbine unit having at least one turbine, there being a combustion chamber situated between compressor unit and turbine unit. An injection device is provided for injecting fuel between the compressors.

12 Claims, 2 Drawing Sheets

GENERATOR UNIT, IN PARTICULAR FOR MOTOR VEHICLES

FIELD OF THE INVENTION

The present invention relates to a generator unit, in particular for motor vehicles, having at least one generator to generate electrical power and having a multistage compressor unit which includes at least two compressors connected in series, and downstream of which a turbine unit having at least one turbine is connected, there being a combustion chamber situated between the compressor unit and the turbine unit.

BACKGROUND INFORMATION

Generator units described above are known. In contrast to the better-known generator units, which provide a reciprocating piston engine to produce a drive torque for a generator, the generator units described above are distinguished by the fact that they enable continuous combustion and pure rotation motions. The principle is based essentially on that of a gas turbine or turboshaft engine, wherein charge air flows into a compressor unit, is compressed thereby and is transported into a combustion chamber, where fuel is injected and the mixture is ignited, which expands due to the combustion and flows out of the combustion chamber into a turbine unit, in which it drives the turbine by converting thermal energy into mechanical energy. At an appropriate point the generator is connected to the turbine unit in such a way that it is driven by the turbine to produce electrical power.

A corresponding turboshaft engine is known for example from German utility model specification DE 20 2008 008 567 U1, which describes a compact power package for land vehicles and watercraft, which is made up essentially of the combination of a gas turbine and a generator.

SUMMARY OF THE INVENTION

The generator unit according to the present invention includes an injection device for injecting fuel between the compressors of the compressor unit. Hence the present invention provides that the fuel is not injected into the combustion chamber, as usual, but upstream from the combustion chamber between the compressors. Both compressors operate at optimal efficiency at the design point. Because the fuel is injected between the two compressors, the mixture is formed already ahead of or upstream from the combustion chamber. The charge air is cooled as a result of the enthalpy of evaporation, so that the compressor located upstream is thermally relieved on the one hand and on the other hand operates at higher efficiency. The injection between the two compressors also results in an advantageously long homogenization time for formation of the mixture until it is ignited or inflamed in the combustion chamber.

It is useful for the injection device to have at least one injector, which is situated between the two compressors. However, the injector does not have to be situated directly in the flow channel between the two compressors, but is preferably located at least essentially outside of the flow channel in such a way that the charge air is able to flow freely through the flow channel. Usefully, a pumping system for the fuel is associated with the injector, which conveys the fuel from a corresponding tank to the injector and brings it to a high pressure, in order to ensure the best possible atomization of the fuel and thus a particularly favorable mixing.

Advantageously, the generator is operatively connected to an output shaft of the turbine. The generator thus extracts the power from the system upstream from the combustion chamber, the mechanical rotational energy of the turbine being used to drive the generator. In comparison to known devices in which a conventional reciprocating piston engine serves as the power source, the preferred generator unit has the advantage of improved acoustics, because of the purely rotationally operating generator unit. To increase the power output of the generator unit, advantageously a plurality of generators are provided, which are operatively connected to the output shaft of the turbine.

An advantageous refinement of the generator unit provides that the output shaft of the turbine is operatively connected to a drive shaft of one of the compressors, in particular using a rotationally fixed connection. The turbine thus directly mechanically drives the corresponding compressor. Advantageously, the compressors and the turbine are radial flow machines, i.e., a radial turbine and radial compressor, so that in particular the output shaft and the drive shaft are not located in the flow channel between the compressors. Preferably, the output shaft of the turbine and the drive shaft of the compressor are designed to form a single piece together as a common shaft, and advantageously are at least partially freely accessible between the turbine and the compressor. That enables the rotational energy of the turbine to be tapped off easily from the common shaft and supplied to the generator.

Usefully, the turbine unit has at least one additional turbine, whose output shaft is operatively connected to a drive shaft of the remaining compressor, in particular using a rotationally fixed connection. Thus a total of at least two compressors and two turbines are provided, each of the turbines driving one of the compressors.

Usefully, the output shaft or drive shaft operatively connected to the generator is operatively connected to the compressor located upstream, i.e., to the low-pressure compressor. The low-pressure compressor operates at a—lower—rotational speed level, which is more favorable for the generator.

It is also advantageously provided that the particular compressors and turbines which are operatively connected to each other are each formed of one exhaust gas turbocharger. As a result, the generator unit ultimately corresponds to two exhaust gas turbochargers whose compressors and turbines are connected in series, and a combustion chamber is provided between them in which a combustible mixture is ignited. The use or provision of exhaust gas turbochargers enables the generator unit to be manufactured particularly simply and economically, since it is possible to utilize known parts and components. Hence the low-pressure compressor is preferably formed of an exhaust gas turbocharger for the commercial vehicles, while the compressor located upstream, i.e., the high-pressure compressor, is formed of an exhaust gas turbocharger for the passenger cars. The performance characteristics of the two exhaust gas turbochargers are usefully matched to each other in order to obtain maximum overall efficiency. A wide performance spread is not necessary with the advantageous generator unit.

Advantageously, there is at least one ignition aid assigned to the combustion chamber, preferably in the form of a glow plug. The glow plug is activated at least when starting the system or the generator unit, and guarantees the initial inflammation. All combustible fuels may be used as the combustible material in connection with continuous combustion. Bypass valves, known as waste gates, are not necessary, eliminating adverse effects on cost and inefficiency.

It is also provided that the generator is operatively connected to the output shaft of the turbine or with the common shaft via a planetary gear transmission. The planetary gear transmission may have a transmission ratio of up to 10:1, so that the rotational speed of the turbine is reduced by a factor of ten. This enables one or more generators to be driven. Usefully, the planetary gear transmission is an inexpensive friction-gear drive based on simple roller bearing components. Alternatively or in addition, if appropriate, the generator together with the planetary gear transmission is integrated into the housing of the particular exhaust gas turbocharger, so that the particular exhaust gas turbocharger forms a particularly compact and easily handled unit.

Alternatively to the described compact design, it is provided that the generator is operatively connected via an endless traction means, in particular a belt drive, to the output shaft or the common shaft of the low-pressure turbine. Using the endless traction means, it is possible for a plurality of generators to be driven simultaneously in a particularly simple and inexpensive manner, and thus to increase the power output of the generator unit.

Finally, it is provided that the generator unit is designed and used as a so-called range extender. Such range extenders, known by the abbreviation REX, are used in particular to extend the range of purely electrically driven vehicles, or also of vehicles having a hybrid drive device, which have both one or more electric drive units and a combustion power unit. The advantageous generator unit, as described above, offers advantages in particular in regard to acoustics, since the contrast between the pure and therefore very quiet electric operation of a motor vehicle and the activated or running range extender or generator unit is very small here. As already explained earlier, the generator unit offers particularly smooth and quiet operation because of its purely rotational operation.

DETAILED DESCRIPTION

Figure 1:
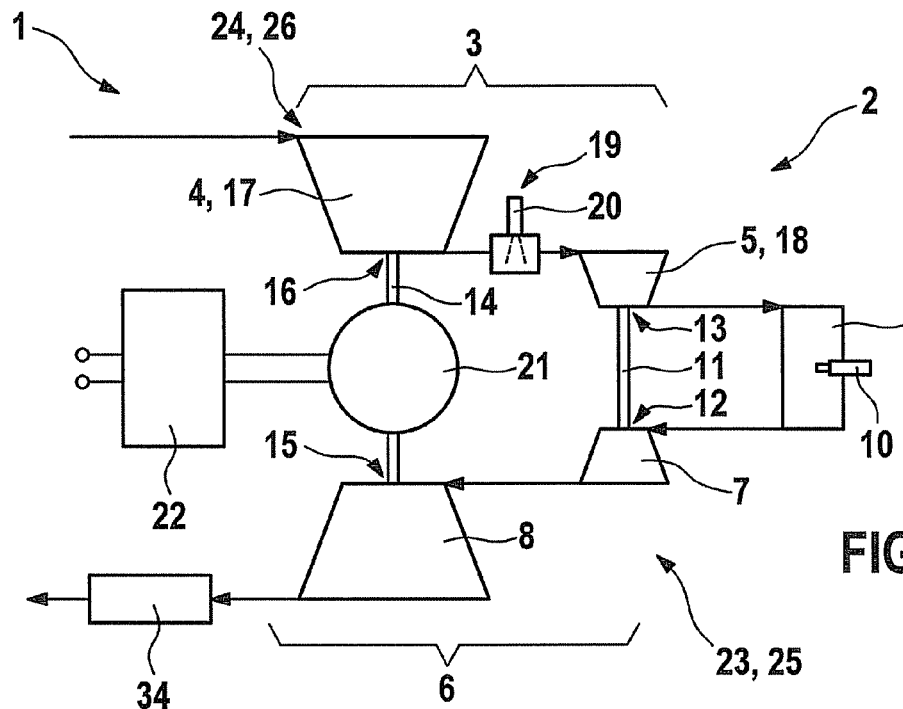
FIG. 1 schematically shows an advantageous generator unit.

FIG. 1 shows a schematic depiction of an advantageous generator unit 1 which serves as a range extender 2 for a motor vehicle which is not shown in further detail here. Generator unit 1 has a compressor unit 3 which includes two compressors 4, 5 connected in series. In addition, generator unit 1 has a turbine unit 6 which includes two turbines 7, 8 connected in series. Situated between compressor unit 3 and turbine unit 6 is a combustion chamber 9, which has a glow plug 10. Compressor 5 and turbine 7 are connected together via a common shaft 11, which forms an output shaft 12 of turbine 7 and a drive shaft 13 of compressor 5. Because of the one-piece design of drive shaft 13 and output shaft 12, the rotating parts of compressor 5 are connected to the rotating parts of turbine 7 in a rotationally fixed connection, so that compressor 5 is drivable by turbine 7. Correspondingly, compressor 4 and turbine 8 are connected together via a common shaft 14, which forms an output shaft 15 of turbine 8 and a drive shaft 16 of compressor 4. Accordingly, the rotating parts of compressor 4 and turbine 8 are connected together in a rotationally fixed connection via shaft 14, so that compressor 4 may be driven by turbine 8. In the present instance, compressor 4 and turbine 8 form a low-pressure stage and compressor 5 and turbine 7 a high-pressure stage of generator unit 1, with at least compressor 4 being a low-pressure compressor 17 and compressor 5 a high-pressure compressor 18.

Between low-pressure compressor 17 and high-pressure compressor 18, an injection device 19 is provided for injecting fuel. To that end, injection device 19 has an injector 20, which is situated at least essentially outside of the flow channel connecting compressor 4 and compressor 5 in such a way that when injector 20 is activated, fuel is mixed into the medium flowing through the flow channel, without injector 20 forming a resistance to the flow of the charge air. Usefully, assigned to injection device 19 is a pumping system for the fuel, not depicted in further detail here, which ensures sufficient injection pressure. Injector 20 is usefully designed to inject an adjustable quantity of fuel continuously.

In addition, generator unit 1 has a generator 21 for producing electrical power, which is operatively connected to shaft 14 and thus to output shaft 15 of turbine 8. The rotational energy of turbine 8 or of the rotating parts of turbine 8 is thus transmitted to generator 21, which produces electrical power as a function of the rotational speed of turbine 8. In the present exemplary embodiment there is an energy accumulator device 22 assigned to generator 21, which accumulates the electrical power and makes it available as needed.

When generator unit 1 is in operation, fuel is supplied by injection device 19 to the charge air coming from low-pressure compressor 17. The mixture is then compressed further by high-pressure compressor 18 and fed to combustion chamber 9, in which continuous combustion of the mixture takes place. Downstream from combustion chamber 9, the exhaust gas produced by the combustion is routed through turbine 7 and then through turbine 8. The mechanical energy thus produced in turbines 7 and 8 from the thermal energy is used to drive compressor 5 or 4 via shaft 11 or 14, respectively. Because of the advantageous injection of the fuel between compressors 4 and 5, the charge air is cooled as a result of the enthalpy of evaporation, so that high-pressure compressor 18 is thermally relieved on the one hand and on the other hand operates at higher efficiency. Furthermore, a particularly homogeneous mixture is produced, since a relatively long homogenization time is available for formation of the mixture until it is inflamed in combustion chamber 9.

Preferably, to prevent flashback, in particular during the startup phase of the system, at least one flame protection grille is situated between high-pressure compressor 18 and combustion chamber 9, in particular at the entrance to the combustion chamber. The power output of generator unit 1 is regulated by adjusting the quantity of fuel continuously injected. Because of the advantageous arrangement and connection of generator 21 to shaft 14, the power take-off for the generator takes place at a lower rotational speed which is more favorable for the generator. Advantageously, the combustion process operates in homogeneous lean mode with air-fuel ratios of approximately 2.5, so that nitrogen oxides remain below a threshold value of 20 mg/standard cubic meter even without expensive emissions aftertreatment devices.

In the present exemplary embodiment, turbine 7 and compressor 5 are formed by a first exhaust gas turbocharger 23, and turbine 8 and compressor 4 by a second exhaust gas turbocharger 24. This makes it possible to manufacture generator unit 1 particularly simply and inexpensively, since known and existing components may be utilized. Exhaust gas turbocharger 23 is designed in this case as a high-pressure exhaust gas turbocharger 25, and exhaust gas turbocharger 24 as a low-pressure exhaust gas turbocharger 26. The performance characteristics of the two exhaust gas turbochargers 23 and 24 are matched to each other in such a way that maximum overall efficiency is achieved. Since a wide performance spread is not needed with generator unit 1 as a range extender 2, optimal matching is possible here.

Figure 2:
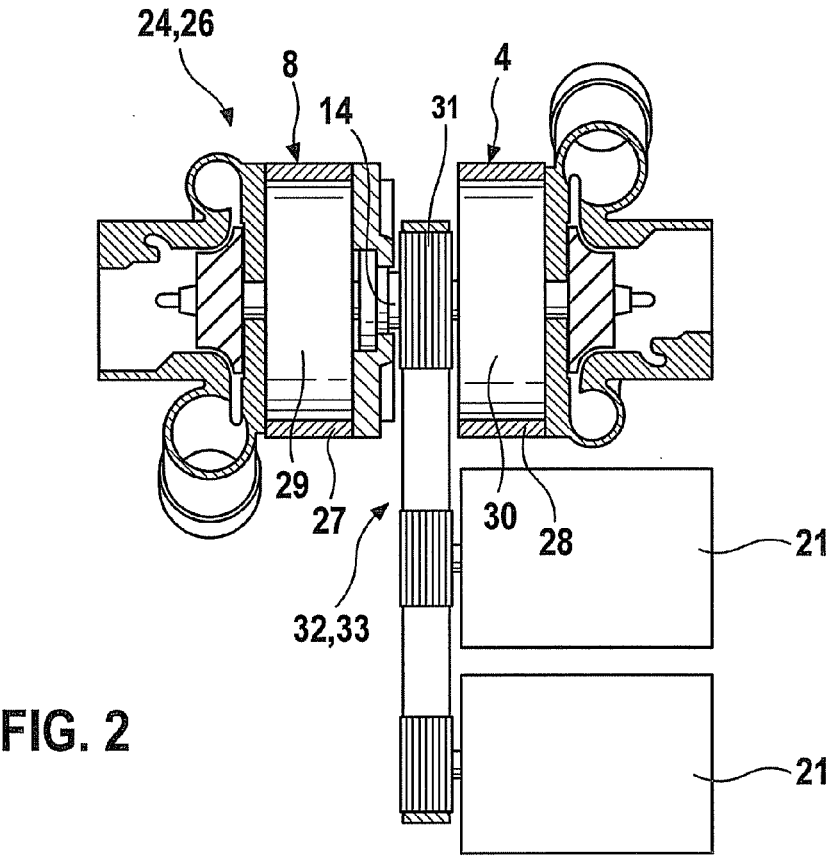
FIG. 2 shows an exhaust gas turbocharger of the generator unit that is operatively connected to generators.

FIG. 2 shows exhaust gas turbocharger 24 in schematic cross section, with turbine 8 depicted at the left of the picture and compressor 4 at the right of the picture. Turbine 8 and compressor 4 each have a housing 27, 28 in which the rotating parts are supported. Since the design of exhaust gas turbochargers is generally known, no further details will be given here. It must be regarded as a peculiarity of exhaust gas turbocharger 24 here that a planetary gear transmission 29 or 30 is provided in each of the housings 27 and 28, which reduces the speed of rotation of the turbine (planetary gear transmission 29) so that shaft 14 is driven at a reduced speed. Shaft 14, which is exposed between housings 27 and 28, has a drive wheel 31 for a belt drive 33 that forms an endless traction means 32. Two generators 21 are driven via belt drive 33 in the present exemplary embodiment. Because of the advantageous speed reduction by planetary gear drive 29, generators 21 may be of inexpensive design. Planetary gear transmissions 29 and 30 are usefully designed as inexpensive friction-gear drives based on simple roller bearing components. These are excellently suited for applications characterized by highly uniform rotation, as may be found in the present generator unit 1.

In an alternate design, a generator 21 may also be designed or integrated directly into housing 27 of turbine 8.

Figure 3:
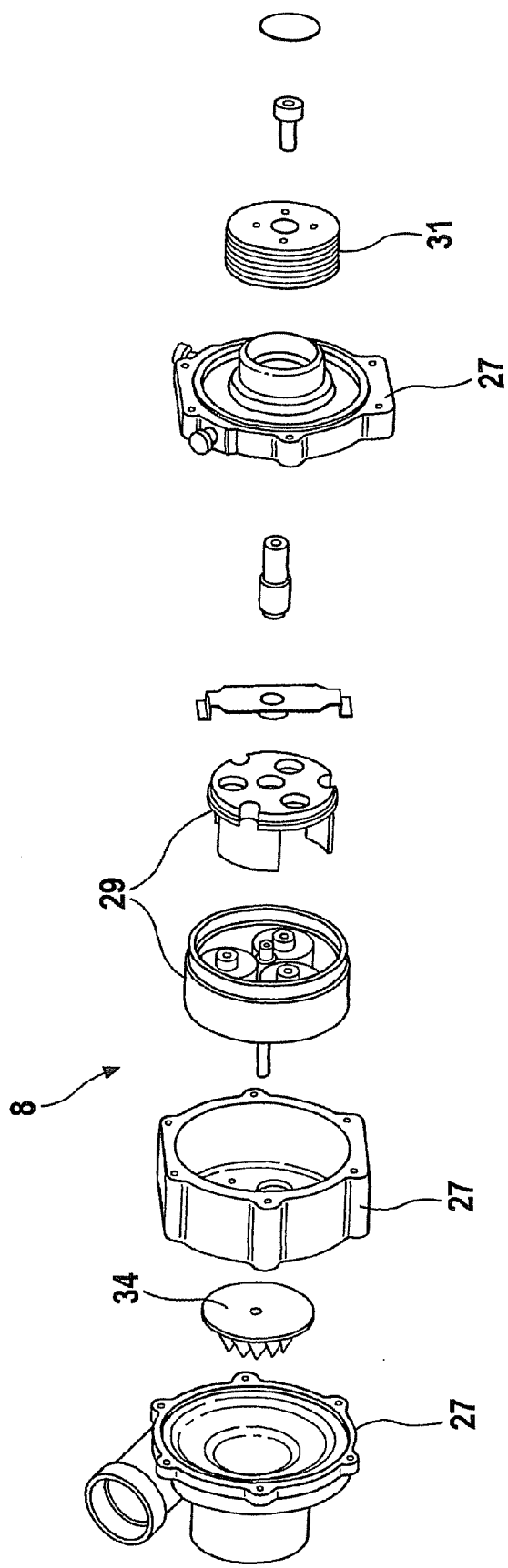
FIG. 3 shows an advantageous specific embodiment of a turbine of an exhaust gas turbocharger of the generator unit in an exploded view.

FIG. 3 shows turbine 8 of generator unit 1 in an exploded perspective view. Along with multi-piece housing 27, turbine 8 has a turbine wheel 34 which is connected to the sun gear of planetary gear transmission 29 in a rotationally fixed connection. Drive wheel 31, which is designed as a belt pulley, is situated outside of housing 27 and is connected to the web or the ring gear of planetary gear transmission 29.

In a refinement not depicted here, a lambda sensor is provided upstream from turbine unit 6 for A/F ratio control. There may be model-based temperature monitoring of the turbine exit temperature, based for example on the measured air mass, the injected fuel mass and the measured combustion chamber pressure, or using an appropriately situated temperature sensor.

While it is possible to detect the speed of rotation of low-pressure exhaust gas turbocharger 26 via generator 21, for example by frequency measurement, the speed of rotation of high-pressure exhaust gas turbocharger 25 may be modeled, for example, on the basis of the transported air mass or measurement values from pressure sensors upstream and downstream from high-pressure exhaust gas turbocharger 25, or detected using an angular speed transducer. That enables both exhaust gas turbochargers 23, 24 to be protected from over-rotation or overspeeding in high-altitude operation.

Because of the already advantageous acoustics of continuously operating generator unit 1, an optional sound damper 34 provided upstream from turbine unit 6 may be manufactured simply, compactly and inexpensively.

The achievable acoustics of generator unit 1 are a much better match for a likewise rotationally operating electrical vehicle drive than for a reciprocating piston engine having free inertial forces, free moments of inertia and possibly critical rotational non-uniformities. Generator unit 1 used as range extender 2 thus offers a particularly convenient option for increasing the range of at least partially electrically driven motor vehicles.

What is claimed is:

1. A generator unit comprising:
   at least one generator for producing electrical power;
   a first exhaust gas turbocharger provided as a high-pressure exhaust gas turbocharger;
   a second exhaust gas turbocharger provided as a low-pressure exhaust gas turbocharger;
   a compressor unit including at least two compressors connected in series, the at least two compressors including a high-pressure compressor and a low-pressure compressor,
   a flow channel which connects a flow output of the low-pressure compressor to a flow input of the high-pressure compressor,
   a turbine unit including a turbine and a further turbine and operatively connected to the compressor unit, a combustion chamber being situated between the compressor unit and the turbine unit; and
   an injection device for injecting fuel into the flow channel between the low-pressure compressor and the high-pressure compressor,
   wherein the second exhaust gas turbocharger includes the low-pressure compressor and the turbine, and wherein an output shaft of the turbine is operatively connected to a drive shaft of the low-pressure compressor,
   wherein the first exhaust gas turbocharger includes the high-pressure compressor and the further turbine, and wherein an output shaft of the further turbine is operatively connected to a drive shaft of the high-pressure compressor,
   wherein the output shaft of the turbine and the drive shaft of the low-pressure compressor are developed separately from the output shaft of the further turbine and from the drive shaft of the high-pressure compressor.

2. The generator unit according to claim 1, wherein the generator unit is for a motor vehicle.

3. The generator unit according to claim 1, wherein the injection device includes at least one injector situated between the at least two compressors.

4. The generator unit according to claim 1, wherein the generator is operatively connected to the output shaft of the turbine.

5. The generator unit according to claim 4, wherein the output shaft operatively connected to the generator is operatively connected to the compressor situated upstream.

6. The generator unit according to claim 4, wherein the generator is operatively connected via a planetary gear transmission to the output shaft of the turbine.

7. The generator unit according to claim 4, wherein the generator is operatively connected via an endless traction device, including a belt drive, to the output shaft of the turbine.

8. The generator unit according to claim 1, wherein the output shaft of the further turbine is operatively connected to the drive shaft of the high-pressure compressor in a rotatably fixed manner.

9. The generator unit according to claim 1, wherein the compressors and turbines operatively connected to each other respectively are formed by one exhaust gas turbocharger each.

10. The generator unit according to claim 1, wherein there is at least one ignition aid assigned to the combustion chamber.

11. The generator unit according to claim 10, wherein the ignition aid is in the form of a glow plug.

12. The generator unit according to claim 1, wherein the generator unit is used as a range extender.

* * * * *